United States Patent [19]

Sommer

[11] Patent Number: 5,540,120
[45] Date of Patent: Jul. 30, 1996

[54] INDEX TABLE WITH A TWO SPEED DRIVE SYSTEM

[75] Inventor: Gordon M. Sommer, Grosse Pointe Farms, Mich.

[73] Assignee: Midwest Brake Bond Company, Warren, Mich.

[21] Appl. No.: 343,215

[22] Filed: Nov. 22, 1994

[51] Int. Cl.$^6$ ............ B60K 41/24; F16D 67/06; B23Q 16/06
[52] U.S. Cl. .......... 74/813 R; 192/18 B; 475/338
[58] Field of Search ............ 74/813 R, 813 L; 475/338, 339; 192/12 R, 18 B

[56] References Cited

U.S. PATENT DOCUMENTS

| | | | |
|---|---|---|---|
| 2,570,444 | 10/1951 | Henkel | 74/813 R |
| 2,887,638 | 5/1959 | Cail et al. | |
| 2,959,988 | 11/1960 | Abrams | |
| 3,640,030 | 2/1972 | Clarke et al. | |
| 3,795,155 | 3/1974 | Price et al. | |
| 3,888,338 | 6/1975 | Mars | |
| 4,006,650 | 2/1977 | Elmer | |
| 4,177,696 | 12/1979 | Moss | |
| 4,189,963 | 2/1980 | Sano et al. | |
| 4,432,443 | 2/1984 | Sommer | 192/12 R |
| 4,494,635 | 1/1985 | Sommer | 192/12 C |
| 4,552,255 | 11/1985 | Sommer | 192/18 A |
| 4,592,251 | 6/1986 | Mason | 192/18 B |
| 4,643,282 | 2/1987 | Edl | 192/18 B |
| 4,765,448 | 8/1988 | Sommer | 192/18 A |
| 4,865,172 | 9/1989 | Sommer | 477/7 |
| 5,172,798 | 12/1992 | Mabee | 192/18 B |
| 5,194,057 | 3/1993 | Sommer | 475/339 |
| 5,195,623 | 3/1993 | Sommer | 192/18 BX |
| 5,323,888 | 6/1994 | Sommer | 192/18 BX |
| 5,454,765 | 10/1995 | Sommer | 475/154 |

FOREIGN PATENT DOCUMENTS

| | | |
|---|---|---|
| 57-18847 | 1/1982 | Japan. |
| 2024058 | 1/1980 | United Kingdom. |

Primary Examiner—Rodney H. Bonck
Assistant Examiner—Troy Grabow
Attorney, Agent, or Firm—Harness, Dickey & Pierce

[57] ABSTRACT

An index table utilizes oil shear brake and clutch technology in combination with a unique final positioning system in order to provide an accurate and reliable index table, the index table incorporates a two speed oil shear drive system for high speed indexing and low speed final positioning. An oil shear brake stops the table at an approximate final position at which time the final positioning system rotates and locks the index table at the correct position after each indexing of the table.

18 Claims, 8 Drawing Sheets

5,540,120

INDEX TABLE WITH A TWO SPEED DRIVE SYSTEM

FIELD OF THE INVENTION

The present invention relates to index tables. More particularly, the present invention relates to index tables which incorporate a two speed oil shear drive system and an oil shear brake system which operate in conjunction with a separate final positioning system for providing the required indexing accuracy.

BACKGROUND OF THE INVENTION

Index tables are well known in the prior art and provide a convenient method for performing multiple operations on a single or a plurality of components. These operations can include machining operations, assembly operations, gauging operations or any other type of manufacturing operation. Typically, an index table is designed to rotate a specified number of angular increments between a loading station and an unloading station with these two stations being positioned adjacent one another or in some cases, the loading station and the unloading station are located at the same position. In-between the loading and unloading station are one or more manufacturing stations located circumferentially around the index table.

A first component is loaded onto the index table in an appropriate fixture at the loading station. If desired, and if the cycle time of the machine allows, as mentioned above, the loading station can also serve as the unloading station. If the loading and unloading station are combined, a finished component would be unloaded from the appropriate fixture prior to the commencement of the loading operation. Once the loading operation and the other various operations around the table have been complete, the table is indexed to place the first component at a station which performs the first operation. While this first operation is being conducted on the first component, a second component is loaded at the adjacent loading station. The table is again indexed and the first component is placed at a station which performs the second operation. While the second operation is being performed on the first component, the first operation is being performed on the second component while a third component is being loaded in a fixture at the loading station. This sequence continues until the first component reaches the unloading station where the finished component is removed. Thus, with each indexing of the table, a completed component is unloaded, a new component is loaded and each station is simultaneously performing its operation on a different component. Depending on the space required for the machinery and/or the number of operations required, an index table will typically cycle anywhere from four to sixteen times in order to complete one turn or one 360° rotation of the index table although the index table can be designed to provide as many or as few stations as the process will require.

When the index table is indexed to each station, it is critical that the location of the index table be accurately controlled to properly locate the component with respect to the machinery at each station in order to provide a consistent and repeatable operation on every component. In addition, the speed with which the table rotates must be kept to a maximum in order to improve the productivity of the operation. While the index table is moving, there are no operations being performed on any component. Thus by keeping the index time to a minimum, the productivity of the index table is improved.

Index tables of various designs have enjoyed wide acceptance in the manufacturing community. The continued development of these index tables is directed towards providing a more reliable and accurate index table while improving upon the performance characteristics of the entire index table system.

SUMMARY OF THE INVENTION

The present invention provides the art with a unique index table which utilizes oil shear brake and clutch technology in combination with a separate final positioning system in order to provide an accurate and reliable index table. The index table of the present invention incorporates a two speed oil shear drive system for high speed indexing with low speed final positioning, an oil shear brake for stopping the table at an approximate final position and a final positioning system to lock the index table at the correct position after each indexing of the table. The final positioning system provides the required accuracy for each angular indexing of the index table.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 13 is a side elevational view, partially in cross section, of the rotary cam limit switch shown in FIG. 1.

DESCRIPTION OF THE PREFERRED EMBODIMENT

Figure 1:
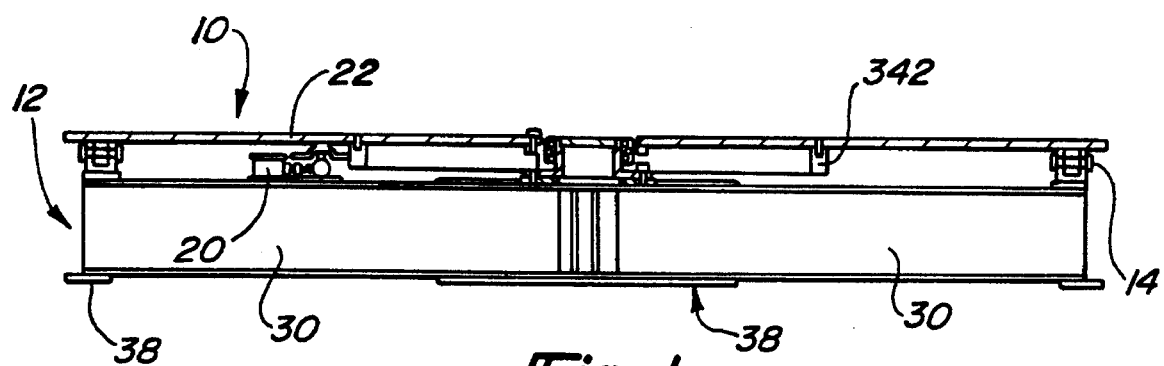
FIG. 1 is a side elevational view, partially in cross section, of an index table according to the present invention.
Figure 2:
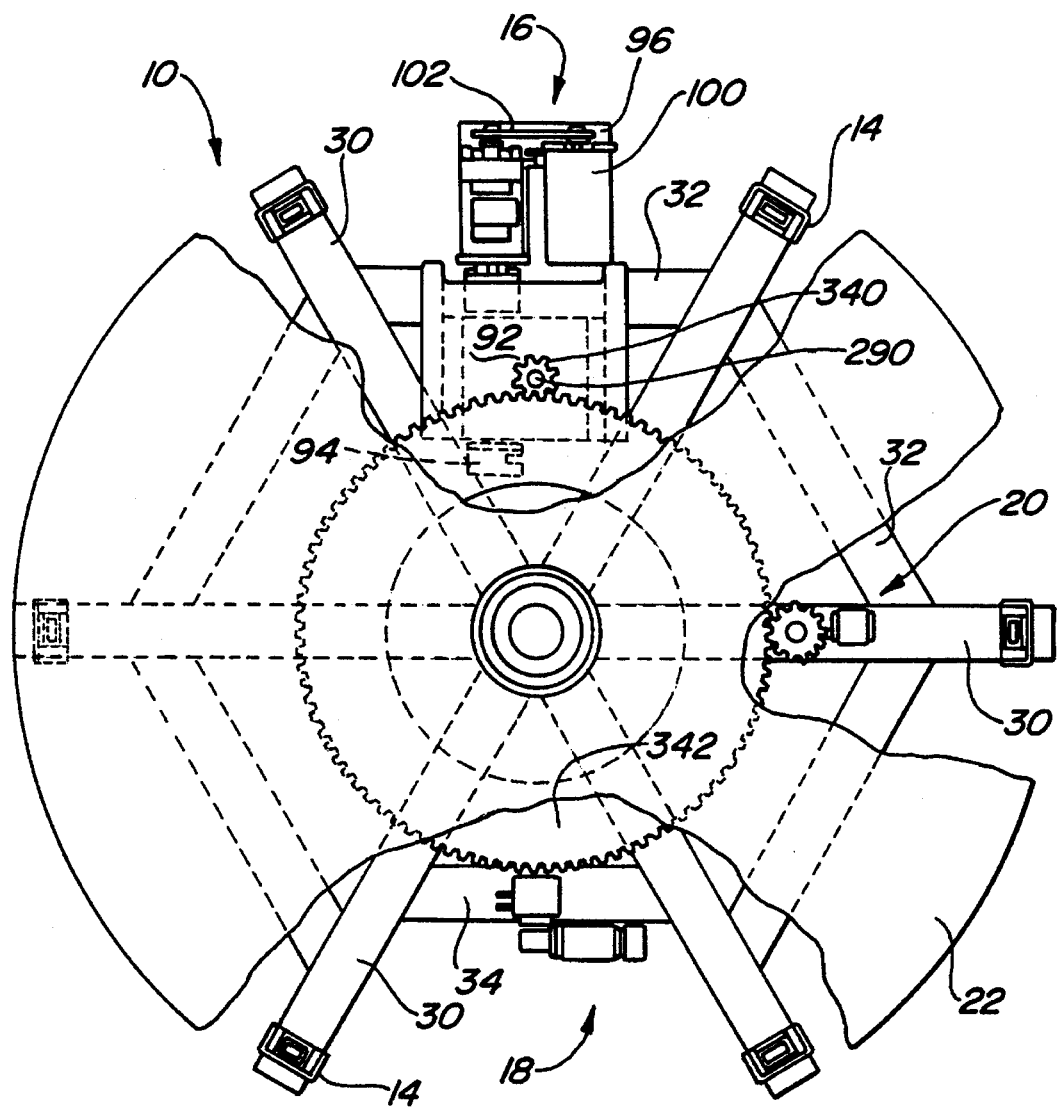
FIG. 2 is a top elevational view of the index table shown in FIG. 1 with portions of the dial plate removed for clarity.

Referring now to the drawings in which like reference numerals designate like or corresponding parts throughout the several views, there is shown in FIGS. 1 and 2, an index table according to the present invention which is indicated generally by the reference numeral 10. Index table 10 comprises a support frame 12, a plurality of roller supports 14, a two speed oil shear drive system 16, a final positioning system 18, a rotary cam limit switch 20 and a dial plate 22.

Support frame 12 comprises a plurality of circumferentially spaced radially extending wide flange I-beams 30 generally defining the diameter of index table 10. For exemplary purposes, the preferred embodiment shown in FIGS. 1 and 2 shows 6 wide flange I-beams 30. Disposed between each adjacent set of I-beams 30 is an additional I-beam 32. I-beams 32 support I-beams 30 and help to maintain the equal spacing between adjacent I-beams 30. Each I-beam 32 is spaced at approximately the same radial distance from the center of index table 10 except that individual I-beams 32 can be spaced as required in order to support additional components of index table 10 as is shown by I-beam 34 which has been moved to provide support for final positioning system 18. Index table 10 can be located directly on a manufacturing floor using mounting pads 38 located at the center of index table 10 and at the end of each I-beam 30, or index table 10 can be located on an elevated platform in order to position index table 10 at a more appropriate height if desired. Each of the plurality of roller supports 14 are located at the radially outer end of a respective I-beam 30 as shown in FIGS. 1 and 2.

Figure 3:
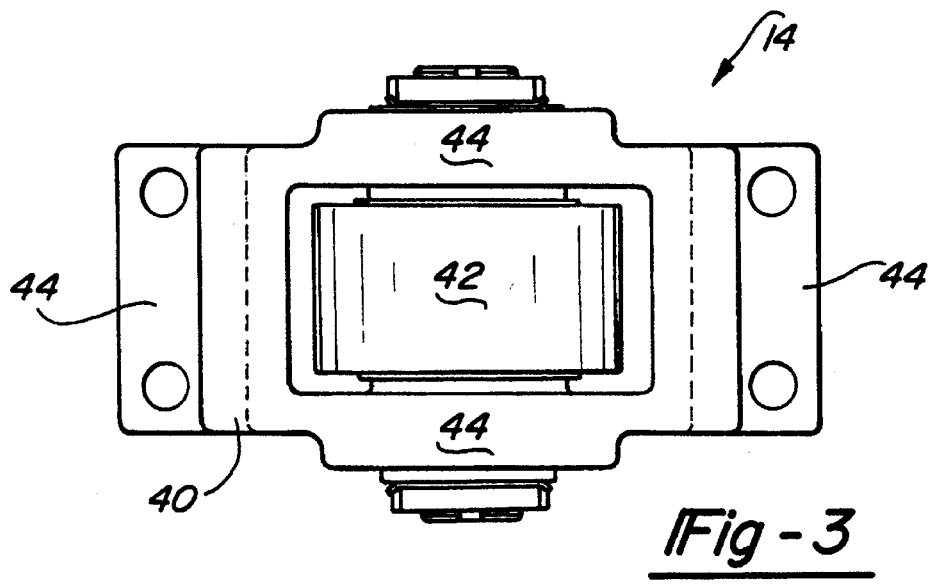
FIG. 3 is an enlarged top plan view of the roller support shown in FIG. 1.
Figure 4:
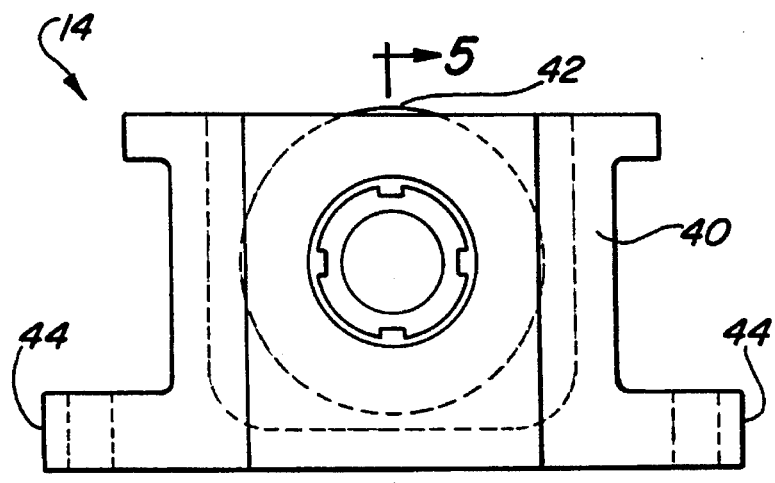
FIG. 4 is a top plan view of the roller support shown in FIG. 3.
Figure 5:
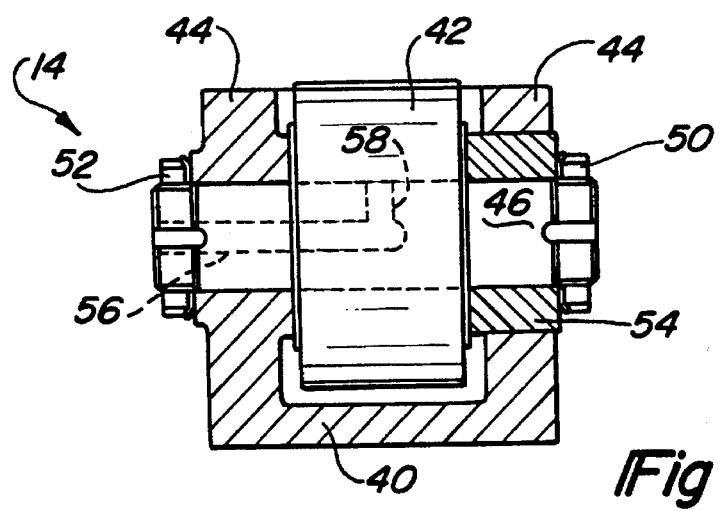
FIG. 5 is an side elevational view in, cross section, of the roller support shown in FIG. 3.

Referring now to FIGS. 3 through 5, roller support 14 comprises mounting frame 40 and a support roller 42. Frame 40 has a generally U-shaped cross section having a pair of mounting feet 44 extending from the lower portion of the base. Support roller 42 is disposed between the extending arms of frame 40 and comprises an axle 46 extending between the arms of frame 40 with support roller 42 rollingly supported on axle 46. A pair of retainers 50 and 52 maintain the position of axle 46 with respect to frame 40. A bushing 54 supports axle 46 within one of the arms of frame 40 and facilitates the assembly of roller support 14. Axle 46 includes an axially extending lubricant passage 56 which mates to a radially extending lubricant passage 58 in order to provide lubricant to the interface between axle 46 and support roller 42. The plurality of roller supports 14 provide rolling support at the outer circumference of dial plate 22.

Figure 6:
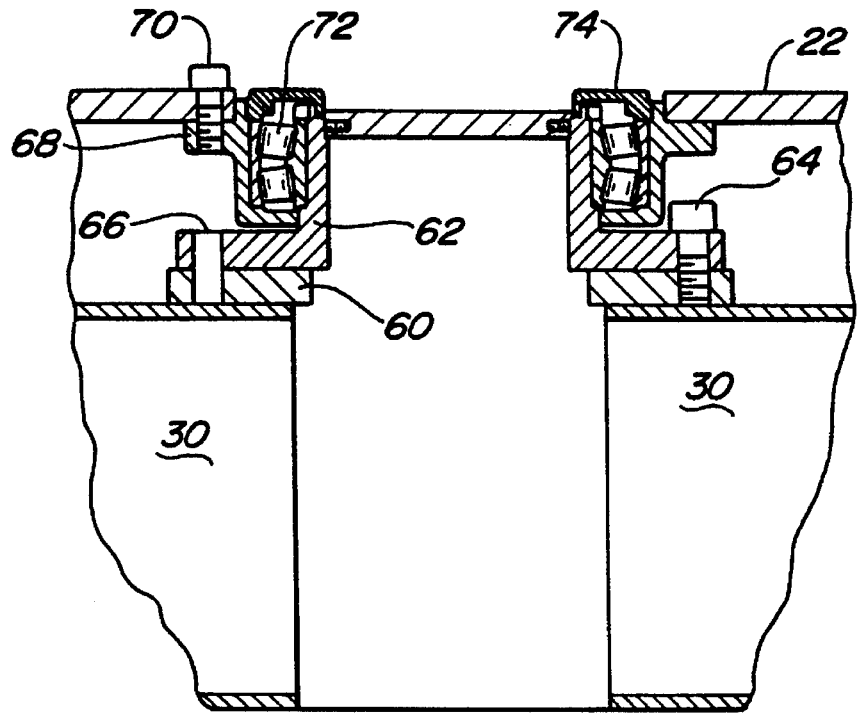
FIG. 6 is an enlarged view of the center mounting for the dial plate shown in FIG. 1.
Figure 7:
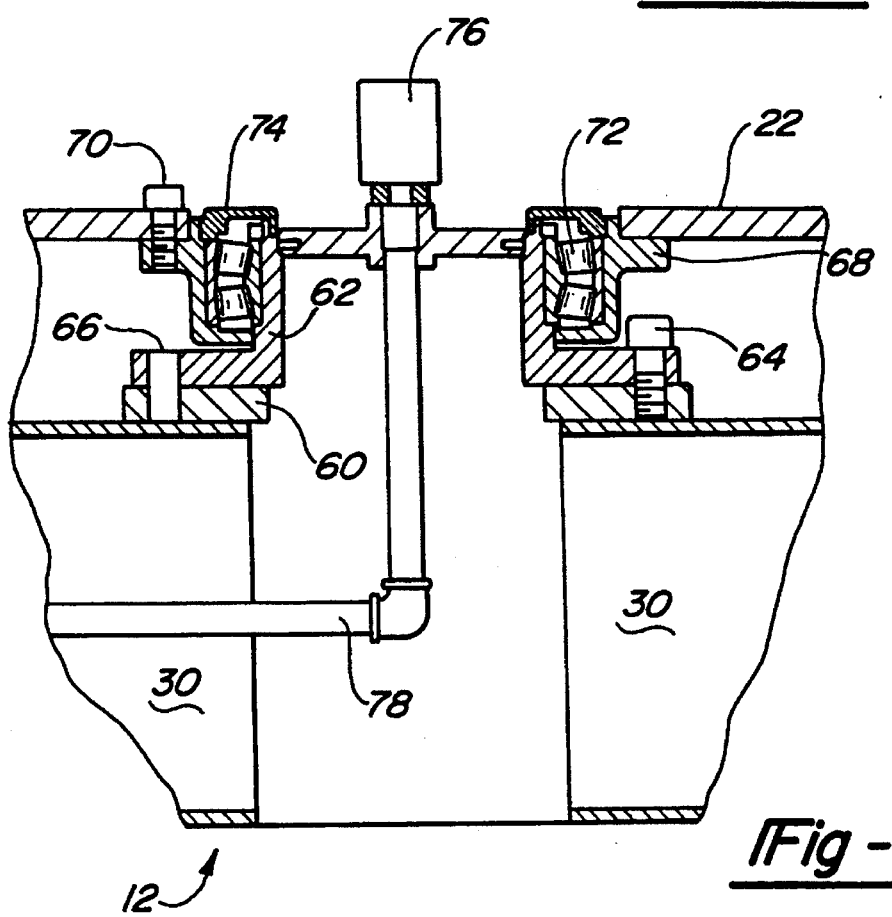
FIG. 7 is a view similar to that shown in FIG. 6 but showing an optional air rotary union incorporated into the index table.

Referring now to FIGS. 6 and 7, the center mounting for dial plate 22 on support frame 12 is shown. The mounting of dial plate 22 onto frame 12 is accomplished using an annular support plate 60 which is fixedly secured to the plurality of I-beams 30 by welding or by other means known well in the art. A bearing mount 62 is fixedly secured to support plate 60 by a plurality of bolts 64 and a plurality of dowel pins 66. A second bearing mount 68 is fixedly secured to dial plate 22 by a plurality of bolts 70 and a bearing 72 is disposed between bearing mounts 62 and 68 to rotatably support dial plate 22 on frame 12. Bearing retainer 74 locates bearing 72 with respect to bearing mounts 62 and 68 respectively. Thus, the center of dial plate 22 is rotatably supported at the center of frame 12 by bearing 72 with the outer circumference of dial plate 22 being supported by the plurality of roller supports 14. This mounting allows dial plate 22 to freely rotate with respect to frame 12. FIG. 7 illustrates an optional air rotary union 76 which is fixedly mounted to index table 10 in order to allow compressed air or the like to be provided to various locations around index table 10. Rotary union 76 allows the various air lines (not shown) to rotate with dial plate 22 while the supply of air to rotary union 76 is provided by a stationary compressed air line 78.

Figure 8:
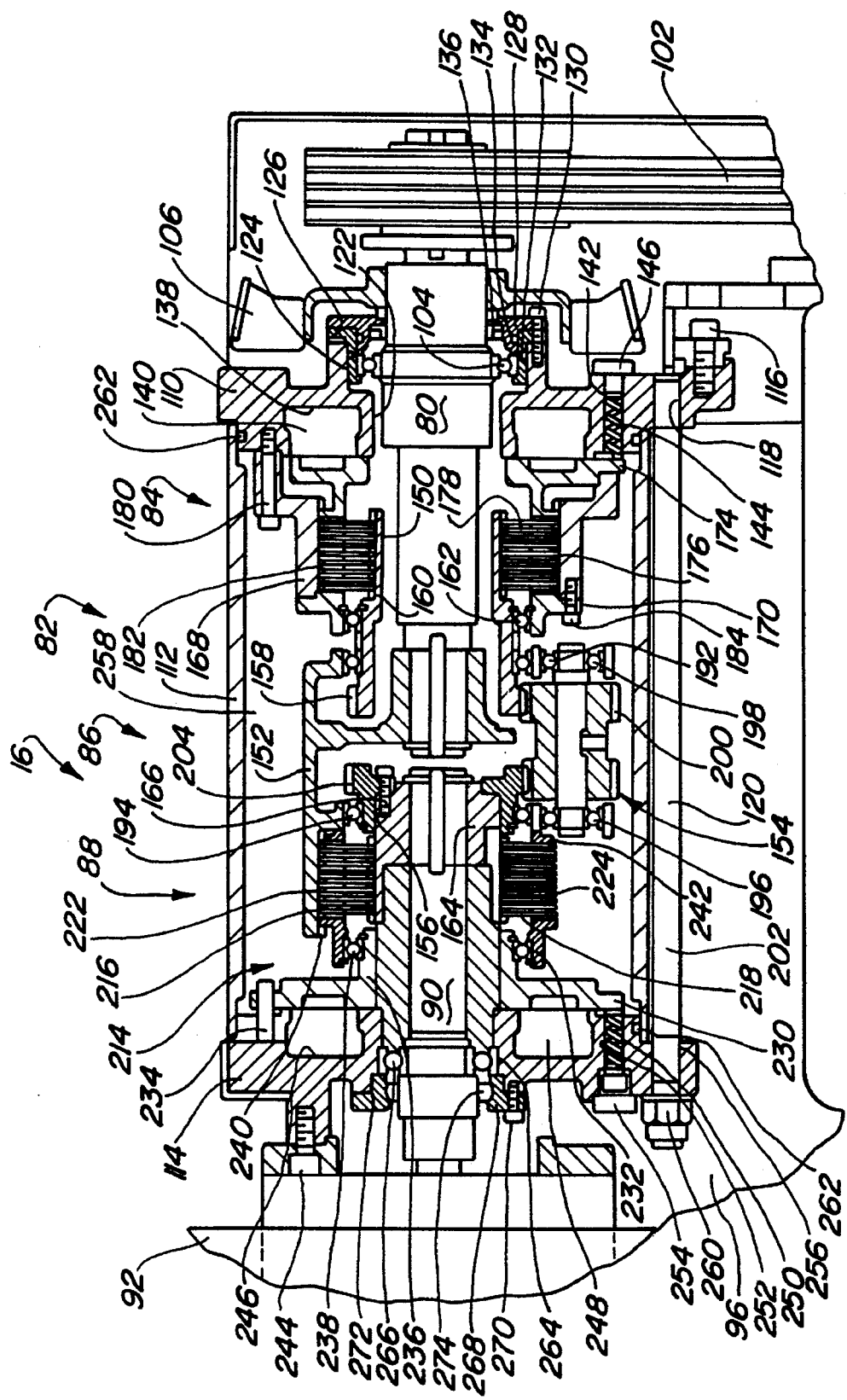
FIG. 8 is a top plan view, partially in cross section, of the two speed drive system shown in FIG. 1.

Referring now to FIGS. 1, 2 and 8, an enlarged view of two speed oil shear drive system 16 is illustrated. Drive system 16 comprises an input shaft 80, a housing assembly 82, a brake assembly 84, a planetary gear train 86, a clutch assembly 88, an output shaft 90, a single reduction worm drive 92, an external brake assembly 94 and a mounting frame 96.

Input shaft 80 is driven at one end at a specified speed by a motor 100 utilizing a plurality of drive belts 102 as is well known in the art. Motor 100 is mounted to frame 96 by means known well in the art and frame 96 is mounted to support frame 12 also by means known well in the art. Input shaft 80 is rotatably disposed within housing assembly 82 by a roller bearing 104. The end of input shaft 80 opposite to the driven end extends axially into housing assembly 82 to provide rotational input to planetary gear train 86 as will be described later herein. A fan 106 is fixedly secured to input shaft 80 between drive belts 102 and housing assembly 82 to provide for the continued flow of cooling air across the exterior surface of housing assembly 82.

Housing assembly 82 comprises a brake control housing 110, a central housing 112 and a clutch control housing 114. Brake control housing 110 is an annular shaped housing which is adapted to be fixedly secured to mounting frame 96 by a plurality of bolts 116. Disposed radially inward from the plurality of mounting bolts 116 are a plurality of threaded holes 118 which receive a plurality of assembly rods 120. Rods 120 are utilized to maintain the integrity of drive system 16 as will be discussed later herein. The end of control housing 110 opposite to mounting bolts 116 is adapted to be fixedly and sealingly attached to central housing 112. Control housing 110 defines a centrally located bore 122 which allows access for input shaft 80 to extend into housing assembly 82. Bore 122 defines an inner cylindrical surface 124 which supports a bearing housing 126 which in turn supports roller bearing 104. Bearing housing 126 is adapted to be fixedly and sealingly attached to control housing 110 by a bearing retainer 128 by utilizing a plurality of bolts 130. A seal 132, located between bearing housing 126 and control housing 110, provides an oil seal for the interior of housing assembly 82. Bearing retainer 128 locates and retains bearing housing 126 and bearing 104. A seal 134 is located between bearing housing 126 and retainer 128 to provide an additional oil seal for the interior of housing assembly 82 and a third seal 136 is located between retainer 128 and input shaft 80 to complete the oil sealing between input shaft 80 and control housing 110.

Disposed within brake control housing 110 is a brake coil cavity 138 which is located in the end of brake control housing 110 adjacent to central housing 112. Disposed within brake coil cavity 138 is an AC voltage brake coil 140. A plurality of circumferentially spaced spring bores 142 extend completely through control housing 110 and are located in control housing 110 radially outward from coil cavity 138. Disposed within each of the plurality of spring bores 142 is a coil spring 144 and an access bolt 146. Coil springs 144 bias brake assembly 84 into an applied condition. Access bolts 146 provide direct access to springs 144 in order to allow for the replacement of springs 144 with a higher or lower rate spring without disassembling drive system 16. Brake coil 140 is utilized for the application and release of brake assembly 84 which functions to lock a member of planetary gear train 86 to housing assembly 82.

Planetary gear train 86 comprises a first sun gear 150, a planetary gear carrier 152, a plurality of compound planetary gears 154 and a second sun gear 156. First sun gear 150 is a tubular member having gear teeth 158 located on its outside surface at one end and spline teeth 160 located on its outside surface at the opposite end. Sun gear 150 is rollingly supported with respect to housing assembly 82 by a roller bearing 162. Spline teeth 160 form a portion of brake assembly 84 which is utilized to lock sun gear 150 to housing assembly 82 when switching drive system 16 between high and low speed operation. Second sun gear 156 is fixedly secured to a collar 164 by a plurality of bolts 166. Collar 164 is fixedly secured to output shaft 90 such that second sun gear 156 and output shaft 90 rotate as a single unit.

Brake assembly 84 comprises a brake reaction housing 168, a brake stop 170, a brake application member 174, a plurality of stationary friction plates 176 and a plurality of driven friction plates 178. Brake reaction housing 168 is secured to brake control housing 110 of housing assembly 82 by a plurality of bolts 180. The interior surface of reaction housing 168 includes a plurality of spline teeth 182 for engagement with the plurality of stationary friction plates 176 as will be described later herein. Brake stop 170 is secured to housing 168 by a plurality of bolts 184 and acts as a stop for the compression of friction plates 176 and 178 during the application of brake assembly 84.

Brake application member 174 is disposed between brake control housing 110 and planetary gear train 86. Brake application member 174 is axially movable between these two components in order to move brake assembly 84 between its applied condition and its released condition. Disposed between brake stop 170 and application member 174 are the plurality of stationary friction plates 176 and the plurality of driven friction plates 178. The plurality of stationary friction plates 176 are splined on their exterior to be drivingly connected to brake reaction housing 168 due to engagement with spline teeth 182. The plurality of driven friction plates 178 are interleaved with the plurality of stationary friction plates 176 and are splined on their interior surface to be drivingly connected to sun gear 150 due to engagement with spline teeth 160.

The plurality of coil springs 144 urge brake application member 174 to the left as shown in FIG. 8. In this position, brake assembly 84 is in the applied condition due to the force applied by springs 144 which sandwich stationary friction plates 176 and driven friction plates 178 between application member 174 and brake stop 170. Stationary friction plates 176 being splined to brake reaction housing 168 of housing assembly 82 and driven friction plates 178 being splined to sun gear 150 thus lock sun gear 150 to housing 112. Upon actuation of AC voltage brake coil 140, application member 174 moves axially to the right as shown in FIG. 8. The magnetic attraction of AC voltage brake coil 140 overcomes the spring force of coil springs 144 and brake assembly 84 is released allowing sun gear 150 to rotate relative to housing assembly 82. When the power to AC voltage brake coil 140 is terminated, coil springs 144 urge application member 174 to the left, as shown in FIG. 8, again applying brake assembly 84 and locking sun gear 150 to housing assembly 82.

Planetary gear carrier 152 is secured to input shaft 80 and thus acts as the input member for the operation of planetary gear train 86. Carrier 152 is rotatably supported on sun gear 150 by a roller bearing 192 and on second sun gear 156 by a roller bearing 194. The plurality of compound planetary gears 154 are each rollingly supported on carrier 152 by a pair of roller bearings 196 and 198. Each compound planetary gear has a first gear 200 which meshes with gear teeth 158 on sun gear 150 and a second gear 202 which meshes with a set of gear teeth 204 located on second sun gear 156.

Clutch assembly 88 functions to lock planetary gear carrier 152 to second sun gear 156 which is in turn secured to output shaft 90. Clutch assembly 88 comprises a clutch engagement member 214, a plurality of driving friction plates 216 and a plurality of driven friction plates 218. An interior surface of planetary gear carrier 152 includes a plurality of spline teeth 222 for engagement with a spline located on the exterior surface of the plurality of driving friction plates 216 as will be described later herein. The plurality of driven friction plates 218 are interleaved with the plurality of driving friction plates 216 and are splined on their interior surface to be drivingly connected to sun gear 150 due to engagement with a plurality of spline teeth 224 located on an exterior surface of collar 164.

Clutch engagement member 214 is disposed between clutch assembly 88 and clutch control housing 114 and comprises an annular clutch pressure plate 230 and a clutch actuator 232. Annular clutch pressure plate 230 is supported by a plurality of circumferentially spaced pins 234 which are fixedly secured to clutch control housing 114. Annular clutch pressure plate 230 is axially movable along pins 234 to move clutch assembly 88 between an engaged and a disengaged condition. Extending axially from clutch pressure plate 230 in a direction away from control housing 114 is an integral hub 236 which is adapted on its exterior surface to support a roller bearing 238. Roller bearing 238 rollingly supports clutch actuator 232.

Clutch actuator 232 is located on roller bearing 238 and has a plurality of splines 240 on its exterior surface adapted for spline engagement with spline teeth 222 of planetary gear carrier 152. Actuator 232 is positioned such that the plurality of driving and driven friction plates 216 and 218 are positioned between actuator 232 and a stop 242 located on planetary gear carrier 152.

Clutch control housing 114 is fixedly secured to worm drive 92 by a plurality of bolts 244 and forms a clutch coil cavity 246 which is located on the side of control housing 52 adjacent clutch assembly 88. Disposed within clutch coil cavity 246 is an AC voltage clutch coil 248. A plurality of circumferentially spaced spring bores 250 extend from coil cavity 246. Disposed within each of the plurality of circumferentially spaced spring bores is a coil spring 252 and an access bolt 254 for providing access to springs 252 in order to change to a higher or lower rated spring without disassembling drive system 16. Coil springs 252 bias pressure plate 230 to the right as shown in FIG. 8. In this position, clutch assembly 88 is in the engaged position with the plurality of driven friction plates 218 and the plurality of driving friction plates 216 being compressed between actuator 232 and stop 242 locking planetary gear carrier 152 to output shaft 90. Output shaft 90 is secured to sun gear 156 which is locked to planetary gear carrier 152 due to the spline engagement or the plurality of driving friction plates 216 being splined to planetary gear carrier 152 and the plurality of driven friction plates 218 being splined to sun gear 156. Upon actuation of AC voltage clutch coil 248, clutch pressure plate 230 and actuator 232 are magnetically attracted to clutch control housing 114 and these components move axially along pins 234 to the left as shown in FIG. 8. The magnetic attraction of AC voltage clutch coil 248 overcomes the spring force of the plurality of coil springs 252 and clutch assembly 88 is disengaged thus releasing output shaft 90 from planetary gear carrier 152. When the power to AC voltage clutch coil 248 is terminated, the plurality of coil springs 252 urge clutch pressure plate 230 and clutch actuator 232 to the right along pins 234 as shown in FIG. 8, again engaging clutch assembly 88 and locking output shaft 90 to planetary gear carrier 152.

Clutch control housing 114 further includes a plurality of circumferentially spaced holes 256 which correspond to threaded holes 118 of brake control housing 110 and receive assembly rods 120 to maintain the integrity of drive system 16. Central housing 112 extends between clutch control housing 114 and brake control housing 110 to define an internal chamber 258. Assembly rods 120 which are threadingly received within holes 118 of control housing 110 extend over central housing 114 and through the plurality of holes 256 in control housing 114. A plurality of nuts 260 sandwich central housing 112 between control housings 110 and 114 to define sealed chamber 258. A pair of seals 262 seal the connection between central housing 112 and control housings 110 and 114 to contain the oil disposed within chamber 258.

Clutch control housing 114 defines a central bore 264 which mounts a roller bearing 266 for rotatingly support output shaft 90. Bore 264 also forms a locating surface for a bearing retainer 268. Bearing retainer 268 is adapted to be fixedly and sealingly attached to control housing 114 by a plurality of circumferentially spaced bolts 270 and a seal 272. Bearing retainer 268 locates an additional seal 274 which is disposed between bearing retainer 268 and output shaft 90 to complete the sealing of chamber 258. Thus, chamber 258 is fluidly sealed by seals 132, 134, 136, 272, 274 and the pair of seals 262. Chamber 258 is filled with a specified quantity of oil to provide lubricant for the oil shear brake and clutch assemblies 84 and 88 as well as providing lubrication for the various components of drive system 16.

Output shaft 90 extends through clutch pressure plate 230 and bore 264 in clutch control housing 114. Output shaft 90 is rotatably supported by bearing 266 and extends axially through bearing 266 to provide power to single reduction worm gear 92. Output shaft 90 continues through worm gear 92 and terminates within external brake assembly 94.

Single reduction worm drive 92 receives rotational input from output shaft 90 and transfers this rotational input to a drive shaft 290 which is disposed perpendicular to output shaft 90. The transfer of this rotational input is accomplished through a conventional worm gear which is well known in the art and will not be discussed further herein. In the preferred embodiment, single reduction worm drive 92 provides a 20 to 1 reduction between output shaft 90 and drive shaft 290 although this ratio can be modified in order to meet a specified requirement. Output shaft 90 continues through worm drive 92 and extends into external brake assembly 94.

Figure 9:
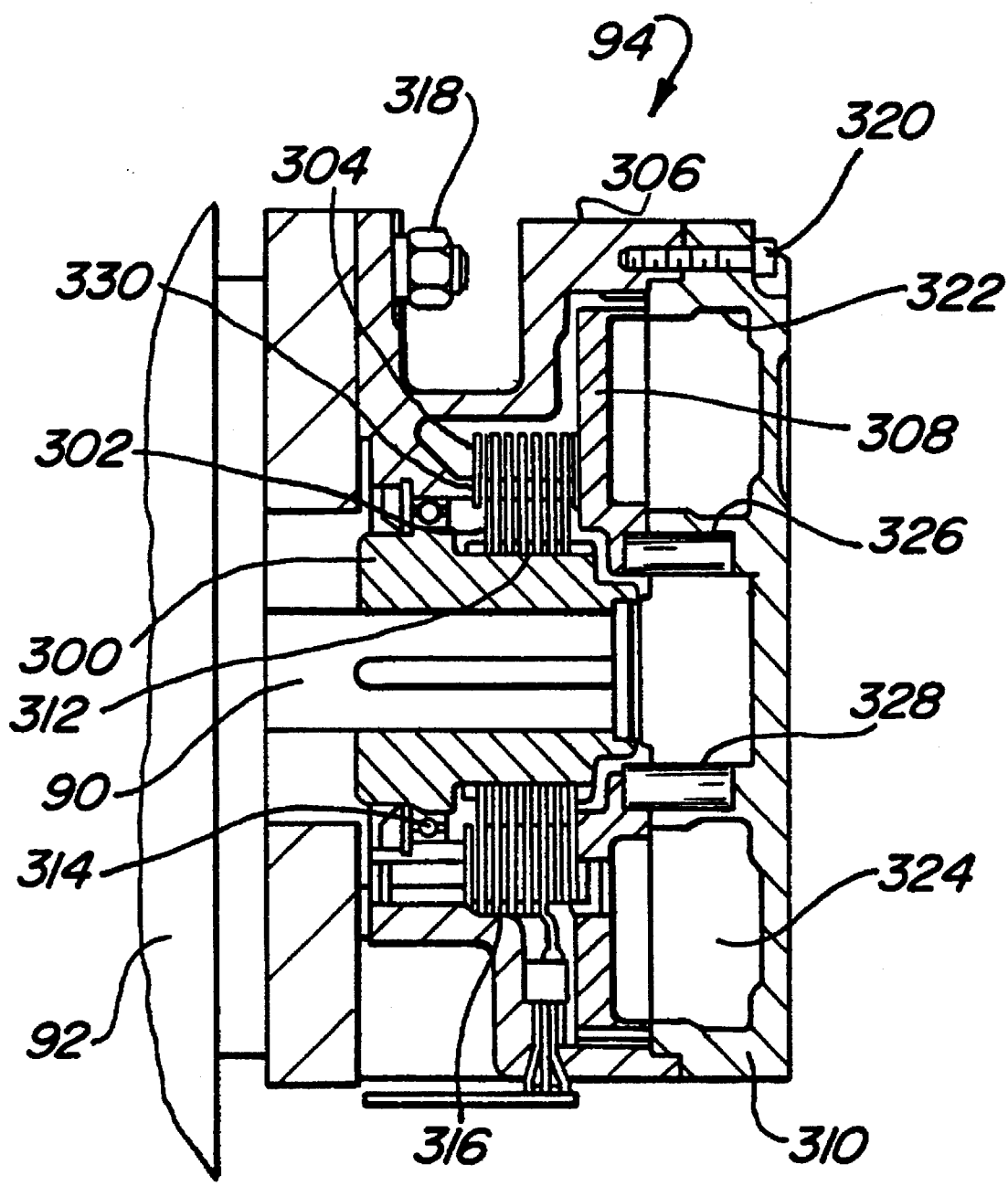
FIG. 9 is a side elevational view, partially in cross section, of the external brake assembly of the two speed drive system shown in FIG. 1.

Brake assembly 94 as best illustrated in FIG. 9 comprises a brake collar 300, a plurality of driven friction plates 302, a plurality of stationary friction plates 304, a brake housing 306, a brake pressure plate 308 and a brake control housing 310. Brake collar 300 is fixedly secured to output shaft 90 for rotation therewith and defines a plurality of splines 312 on its exterior surface. A bearing 314 is disposed between collar 300 and brake housing 306 to rollingly support collar 300 and thus output shaft 90 with respect to brake housing 306. The plurality of driven friction plates 302 have a spline on their interior surface to drivingly engage brake collar 300. Interleaved with the plurality of driven friction plates 302 are the plurality of stationary friction plates 304. The plurality of stationary friction plates 304 are splined on their exterior surface to drivingly engage a spline 316 disposed in the interior surface of brake housing 306. Brake housing 306 is fixedly secured to worm drive 92 by a plurality of bolts 318.

Brake control housing 310 is fixedly secured to brake housing 306 by a plurality of bolts 320 such that pressure plate 308 is disposed between control housing 310 and the plurality of driven and stationary friction plates 302 and 304. Brake control housing 310 defines a brake coil cavity 322 which is located on the side of brake control housing 31 0 adjacent worm drive 92. Disposed within brake coil cavity 322 is an AC voltage brake coil 324. A plurality of circumferentially spaced spring bores 326 extend into control housing 310 and are located radially inward from coil cavity 322. Disposed within each of the plurality of circumferentially spaced spring bores 326 is a coil spring 328. Coil springs 328 bias pressure plate 308 to the left as shown in FIG. 9. In this position, brake assembly 94 is in the applied condition with the plurality of driven friction plates 302 and the plurality of stationary friction plates 304 being compressed between pressure plate 308 and a stop 330 located on brake housing 306. Output shaft 90 is locked to brake housing 306 and thus worm drive 92 due to the splined engagement of the plurality of driven friction plates 302 being splined to collar 300 and the plurality of stationary friction plates being splined to brake housing 306. Upon activating of AC voltage brake coil 324, pressure plate 308 is magnetically attracted to control housing 310 and it moves axially to the right as shown in FIG. 9. The magnetic attraction of AC voltage brake coil 324 overcomes the spring force of the plurality of coil springs 328 and brake assembly 94 is released. Output shaft 90 is thus free to rotate relative to worm drive 92.

The operation of drive system 16 begins with input shaft 80 rotating at a constant speed due to power being supplied to motor 100. Power is supplied to brake coil 140 to release brake assembly 84 and to clutch coil 248 to disengage clutch assembly 88. There is no power supplied to brake coil 324 and brake assembly 94 is in its applied condition locking output shaft 90 to worm drive 92. Input shaft 80 is thus free to rotate within housing assembly 82.

High speed operation of drive system 16 is achieved by terminating power to clutch coil 248 to engage clutch assembly 88 and simultaneously supplying power to brake coil 324 to release brake assembly 94. Clutch assembly 88 locks input shaft 80 to output shaft 90 and drive system 16 acts as a direct one to one drive system. Output shaft 90 of drive system 16 is stopped by supplying power to clutch coil 248 to disengage clutch 88 and simultaneously terminating power to brake coil 324 to apply brake assembly 94. This allows input shaft 80 to again freely rotate while brake assembly 94 brings output shaft 90 to a stop.

Low speed operation of drive system 16 is achieved by terminating power to brake coil 140 to apply brake assembly 84 and simultaneously supplying power to brake coil 324 to release brake assembly 94. When drive system 16 is in the above condition, rotation from input shaft 80 will rotate carrier 152 which will in turn rotate planetary gear 154. Planetary gears 154 and carrier 1 52 will rotate around sun gear 150 which is locked to housing assembly 82 by brake assembly 84. Planetary gears 154 will rotate output shaft 90 through second sun gear 156. The rotation of output shaft 90 by input shaft 80 in this condition is in the same direction but at a reduced speed than that of input shaft 80. The speed ratio of gear train 86 will depend on its configuration and will be determined by the following equation.

$$F = 1 - \left( \frac{C * X}{Y * B} \right)$$

Where:

F=rotation of output shaft 90

C=number of teeth on sun gear 150

X=number of teeth of second planetary gear 202

Y=number of teeth on planetary gear 200
B=number of teeth on second sun gear 156

In the preferred embodiment, gear sizes are selected in order to provide a gear reduction in the area of twenty two to one. Output shaft 90 of drive system 16 is stopped by terminating power to brake coil 324 to apply brake assembly 94 and simultaneously supplying power to brake coil 140 to release brake assembly 84. This allows input shaft 80 to again freely rotate while brake assembly 94 brings output shaft 90 to a stop.

The rotation of output shaft of drive system 16 operates to rotate drive shaft 290 of worm drive 92 as detailed above. A pinion gear 340 is fixedly secured to drive shaft 290 and is drivingly meshed with a gear 342 which is fixedly secured to dial plate 22. Thus, the rotation or drive shaft 290 results in the rotation of dial plate 22. In the preferred embodiment, pinion gear 340 has 36 teeth and gear 342 has 528 teeth. This allows for gear 342 to be rotated a whole number of gear teeth when the number of indexes per revolution equals 4, 6, 8, 12 or 16 providing the flexibility for index table 10 to accommodate a wide variety of operating requirements.

Figure 10:
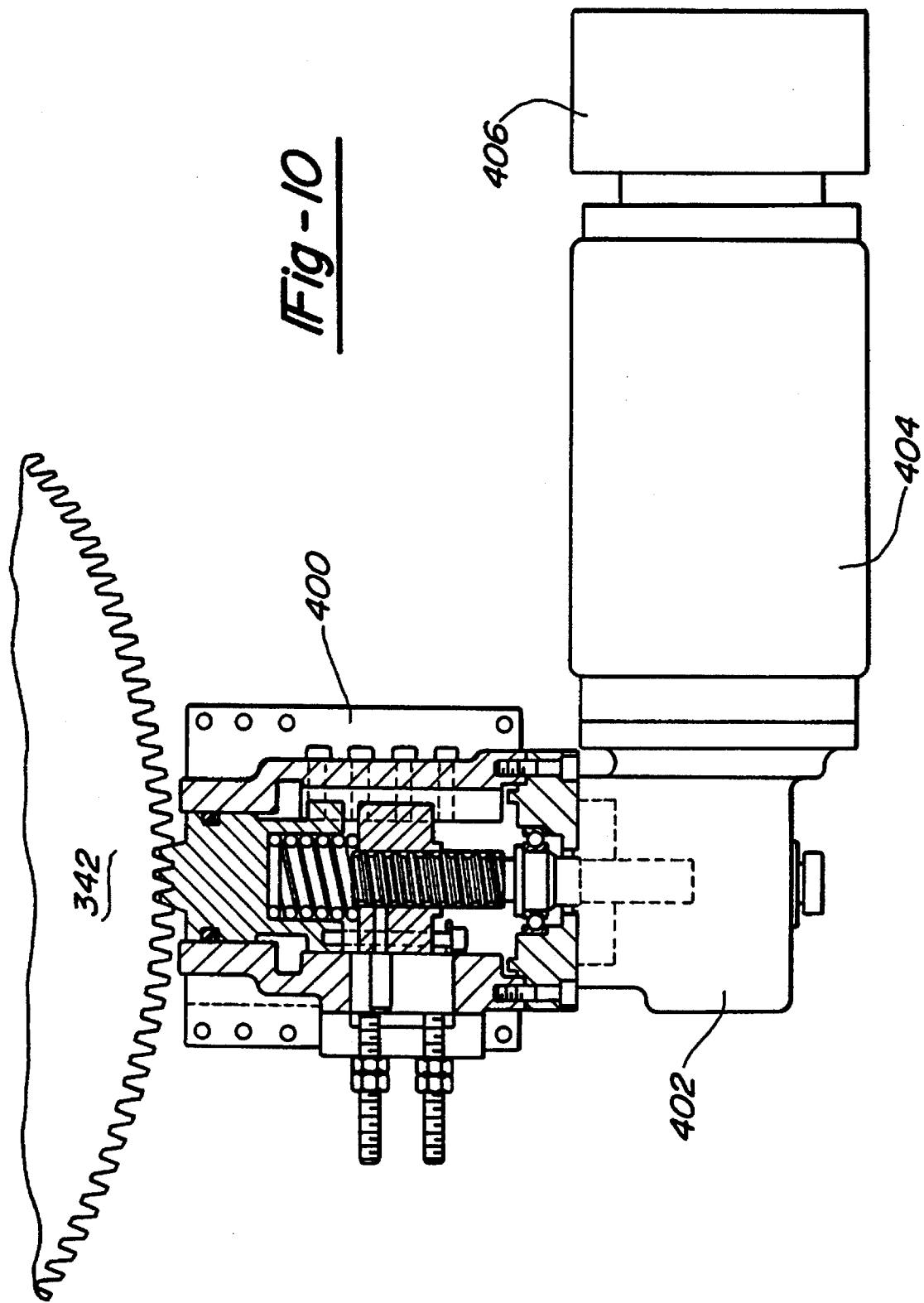
FIG. 10 is a top plan view, partially in cross section, of the final positioning system shown in FIG. 1.
Figure 11:
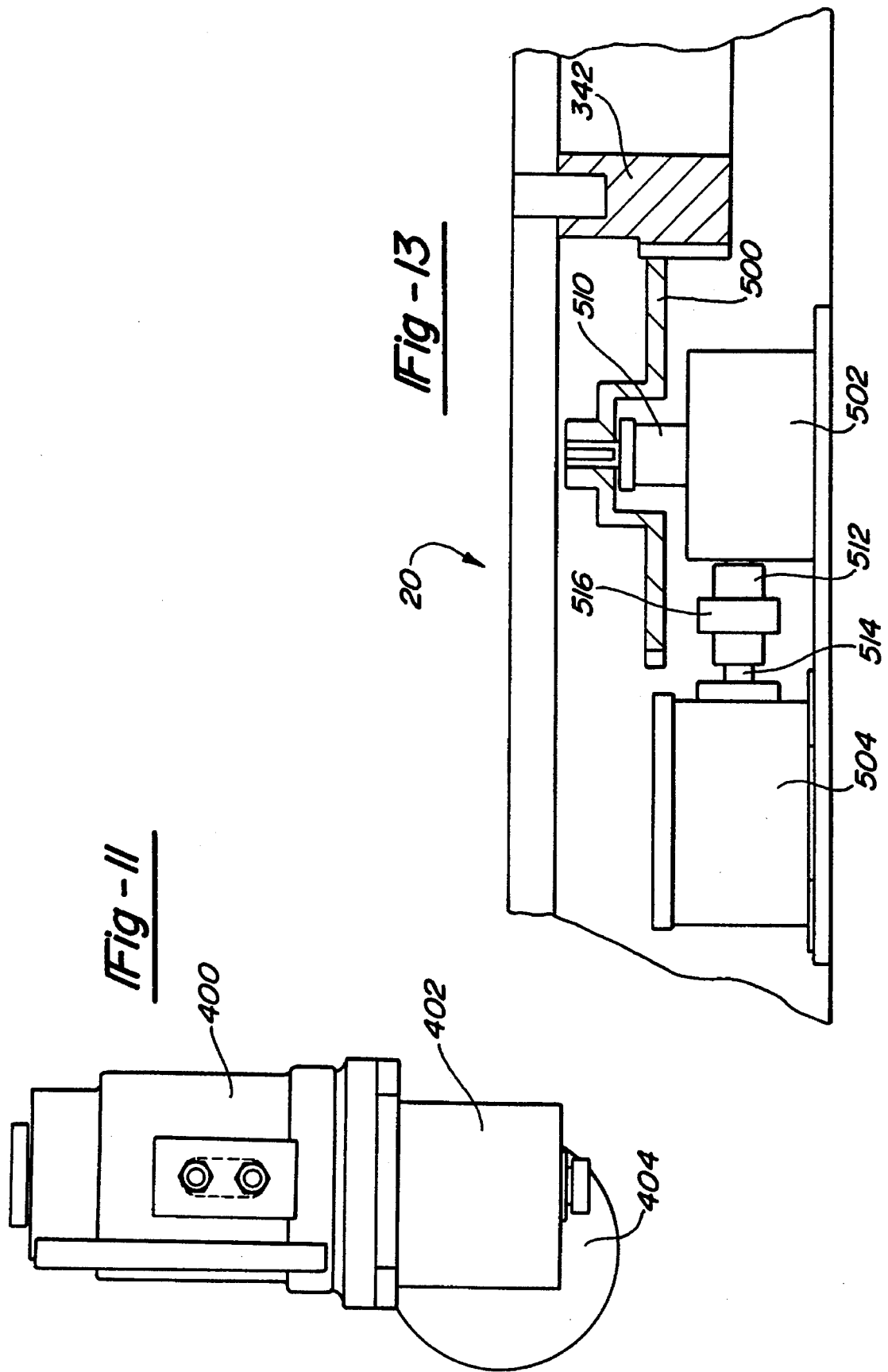
FIG. 11 is an end view of the final positioning system shown in FIG. 10.
Figure 12:
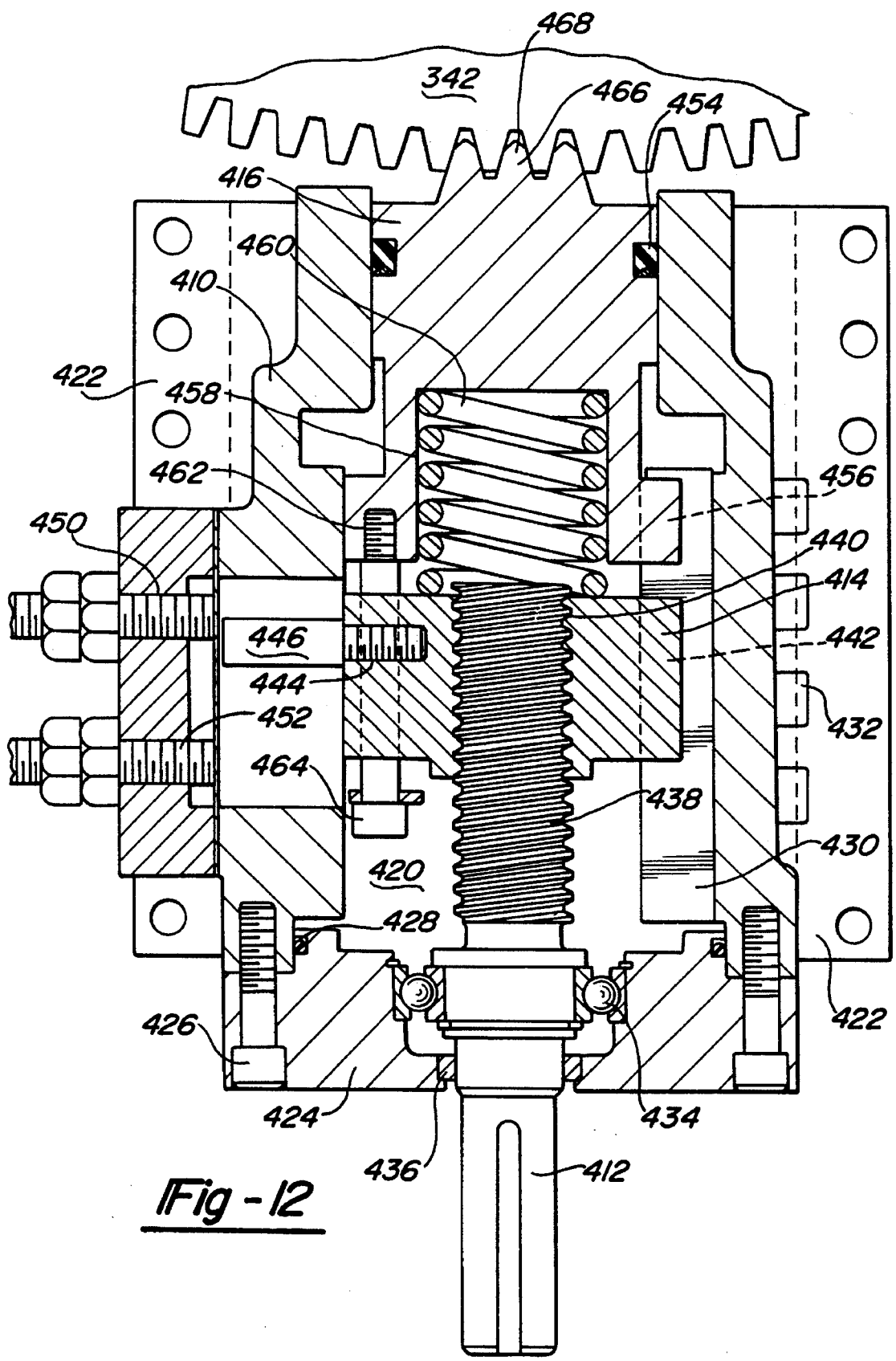
FIG. 12 is an enlarged plan view, partially in cross section, of the positioning head of the final positioning system shown in FIG. 10.

Once drive system 16 has rotated dial plate 22 the specified number of teeth, final positioning system 18, best shown in FIGS. 10–12 is activated to insure the accuracy of the indexed table. Final positioning system 18 comprises a positioning head 400, a single reduction worm drive 402, a drive motor 404 and an oil shear brake assembly 406.

Positioning head 400, best shown in FIG. 12, comprises a housing 410, an acme type threaded shaft 412, an acme type threaded nut 41 4 and a piston 416. Housing 410 defines an internal cavity 420 which extends through housing 410 and a pair of flanges 422 which extend from housing 41 0 to facilitate the attachment of positioning head 400 and thus final positioning system 18 onto frame 12 as shown in FIG. 1. An end plate 424 is sealingly and fixedly secured to one end of housing 410 by a plurality of bolts 426 and a seal 428 in order to facilitate the attachment of shaft 412. An anti-rotation plate 430 is fixedly secured within cavity 420 by a plurality of bolts 432 in order to prohibit nut 414 and piston 416 from rotating with respect to housing 410.

Shaft 412 is rotatably secured to end plate 424 by a bearing 434 and extends through end plate 424 into internal cavity 420. A seal 436 disposed between end plate 424 and shaft 412 seals cavity 420 from the external environment. Shaft 412 defines an acme thread 438 which is located on the exterior surface of the end of shaft 412 which is disposed within cavity 420.

Nut 414 defines an acme threaded bore 440 which threadably engages thread 438 of shaft 412 such that nut 41 4 moves axially within cavity 420 due to the rotation of shaft 412. A slot 442 extending through nut 414 slidingly mates with anti-rotation plate 430 to prohibit any rotational movement of nut 414 with respect to housing 410. Nut 414 defines an additional threaded bore 444 which extends generally perpendicular to bore 440. Bore 444 threadingly receives a positioning rod 446 which extends into a chamber 448 formed into housing 410 to mate with a pair of proximity sensors 450 and 452 which detect the position of nut 414 within cavity 420.

Piston 416 is disposed within cavity 420 adjacent to nut 414 and is located at the end of cavity 420 opposite to end plate 424. A seal 454 disposed between housing 410 and piston 416 seals cavity 420 from the external environment. A slot 456 extending through a portion of piston 416 slidingly mates with anti-rotation plate 430 to prohibit any rotational movement of piston 416 with respect to housing.

Piston 416 defines a spring pocket 458 within which is located a coil spring 460 which is disposed between piston 416 and nut 414 to bias piston 416 away from nut 414. Piston 416 further defines a threaded bore 462 which extends into piston 416 generally parallel to spring pocket 458. A guide bolt 464 extends through nut 414 and is threadingly received within bore 462. The end of piston 416 opposite to spring bore is provided with a plurality of teeth 466 which extend outside of cavity 420 to mate with gear 342 located on dial plate 22. Each tooth includes a formed end 468 which is designed to mate with the teeth on gear 342 and operate to cam gear 342 into its final location when gear teeth 466 are partially engaged with gear 342 due to the axial movement of piston 416.

Worm drive 402 is secured to housing 410 and includes an output member (not shown) which mates with shaft 412. Drive motor 404 is secured to worm drive 402 and includes a drive shaft (not shown) which drivingly engages an input member (not shown) of worm drive 402. The rotational input of motor 404 rotates the input member of worm drive 402 which rotates the output member of worm drive 402 which in turn rotates shaft 412. The rotation of shaft 412 causes the axial movement of nut 414 which then causes the axial movement of piston 416 due to coil spring 460 and guide bolt 464. The axial movement of piston 416 engages and disengages gear teeth 466 with the gear teeth on gear 342. The engaged position of gear teeth 466 is sensed by proximity sensor 450 and the disengaged position of gear teeth 466 is sensed by proximity sensor 452.

Oil shear brake assembly 406 is secured to motor 404 and operates to stop the rotation of the drive shaft of the motor when either of the proximity sensors 450 or 452 sense the final position of nut 414. Brake assembly 406, motor 404, and worm drive 402 are well known in the art and their details will not be discussed further herein.

The operation of index table 10 is controlled by rotary cam limit switch 20 which is best illustrated in FIG. 13. Rotary cam limit switch 20 comprises a drive gear 500, a transfer case 502 and an electro cam 504. Drive gear 500 meshed with gear 342 and provides rotational drive to an input shaft 51 0 of transfer case 502. Transfer case 502 receives rotational input from input shaft 510 and transmits rotational output through output shaft 512. In the embodiment shown, for exemplary purposes, output shaft 512 is disposed at a 90° angle to input shaft 510. The drive ratio between input shaft 510 and output shaft 512 can be selected to meet the specific requirements of index table 10 as will be described later herein. Output shaft 512 is connected to an input member 514 of electro cam 504 via a drive coupling 516. Electro cam 504 controls the operation of index table 10 based upon the rotational position of input member 514. Electro cam 504 is well known in the art and its details will not be discussed further herein.

The size of drive gear 500 and the ratio of transfer case 502 are selected to provide one revolution of input member 514 for one index of dial plate 22. Thus, when gear 342 has 528 teeth, the following table applies.

| IDEXES/REVOLUTION | 4 | 6 | 8 | 12 | 16 |
|---|---|---|---|---|---|
| TEETH/INDEX | 132 | 88 | 66 | 44 | 33 |
| TEETH ON DRIVE GEAR (500) | 66 | 44 | 33 | 44 | 33 |
| TRANSFER CASE (502) RATIO | 2:1 | 2:1 | 2:1 | 1:1 | 1:1 |

Index table 10 can thus be easily switched from various indexes/revolution by simply replacing rotary cam limit switch 20.

The operation of index table 10 begins with dial plate 22 stationary and power being supplied to motor 100 of drive system 16 which is in its neutral position due to power being supplied to brake coil 140 and to clutch coil 248 and no power being supplied to brake coil 324. Final positioning system 18 is located in its extended position with gear teeth 466 engaged with gear 342 of dial plate 22 to both position dial plate 22 and prohibit its rotational movement.

When a signal is received to index dial plate 22, power is provided to final positioning system 18 to release brake assembly 406 and to rotate motor 404 in a direction which will retract piston 416. Motor 404 drives worm drive 402 which in turn drives shaft 412. The rotation of shaft 412 moves nut 414 and piston 416 axially to withdraw teeth 466 from engagement with gear 342. Motor 404 continues to operate until proximity sensor 452 senses that gear teeth 466 are disengaged from gear 342 allowing the rotation of dial plate 22. The sensing of the position of nut 414 by sensor 452 causes power to be terminated to motor 404 and brake assembly 406 bringing to stop the movement of nut 414 and piston 416.

Substantially simultaneously to the termination of power to motor 404 and brake assembly 406 of final positioning system 18 is the activation of high speed operation of drive system 16. This is accomplished by the termination of power to clutch coil 248 to engage clutch assembly 88 and the supplying of power to brake coil 324 to release brake assembly 94. Clutch assembly 88 locks input shaft 80 to output shaft 90 and drive system 16 acts as a direct drive to rotate dial plate 22 through worm drive 92. The high speed operation of drive system 16 continues until rotary cam limit switch 20 switches drive system 16 from its high speed operation into its low speed operation. This is accomplished by providing power to clutch coil 248 to disengage clutch assembly 88 and terminating power to brake coil 140 to apply brake assembly 84. In this condition, rotation from input shaft 80 will rotate carrier 152 which will in turn rotate planetary gears 154. Planetary gears 154 and carrier 152 will rotate around sun gear 150 which is locked to housing assembly 82 by brake assembly 84. Planetary gears 154 will rotate output shaft 90 through sun gear 156 at a reduced speed. The low speed operation of drive system continues until rotary cam limit switch 20 completes one full revolution which indicates that dial plate 22 has reached its approximate indexed position. At this time power is terminated to brake coil 324 to apply brake assembly 94 and power is supplied to brake coil 140 to release brake assembly 84 of drive system 16. This allows input shaft 80 to rotate freely while dial plate 22 is held in position by brake assembly 94 which brings output shaft 90 and thus worm drive 92 to a stop.

The final accuracy for the positioning of dial plate 22 is insured by the activation of final positioning system 18. Once drive system 16 is stopped, power is provided to final positioning system 18 to release brake assembly 406 and to operate motor 404 in order to rotate motor 404 in a direction which will extend piston 416. Motor 404 drives worm drive 402 which in turn drives shaft 412. The rotation of shaft 412 moves nut 414 and piston 416 axially to extend teeth 466 into engagement with gear 342. Formed end 468 of teeth 466 operate to cam gear 342 into its final position against the load of brake assembly 94. Motor 404 continues to operate until proximity sensor 450 senses that gear teeth 466 are engaged with gear 342 and the cycle is complete. The sensing of the position of nut 41 4 by sensor 450 causes power to be terminated to motor 404 and brake assembly 406 bringing to a stop the movement of nut 414 and piston 416. The indexing of table 10 is complete and the system is in a position to accept an additional command to again cycle index table 10.

While the above detailed description describes the preferred embodiment of the present invention, it should be understood that the present invention is susceptible to modification, variation and alteration without deviating from the scope and fair meaning of the subjoined claims.

What is claimed is:

1. An index table comprising:

a support frame;

a dial plate including a driven gear rotatably supported by said support frame;

a two speed drive system mounted to said frame and coupled to said dial plate to rotate said dial plate, said two speed drive comprising:

a housing;

an input device rotatably supported by said housing;

an output device rotatably supported by said housing;

a planetary gear train disposed between said input device and said output device;

a selectively operable brake for prohibiting rotation of one member of said planetary gear train;

a selectively operable clutch for locking said planetary gear train to said output device;

a final positioning system associated with said dial plate; and a control system in communication with said dial plate, said two speed drive system and said final positioning system for controlling the operation of said index table.

2. The index table according to claim 1 wherein, said two speed drive system further comprises a second selectively operable brake for prohibiting rotation of said output device.

3. The index table according to claim 1 wherein, said drive system further comprises a worm drive having an input shaft and an output shaft, said input shaft being secured for rotation with said output device, said output shaft being disposed generally perpendicular to said input shaft.

4. The index table according to claim 3 wherein, said two speed drive system further comprises a second selectively operable brake for prohibiting rotation of said output device, said worm drive being disposed between said clutch and said second brake.

5. The index table according to claim 4 further comprising a brake biasing member for urging said second brake into an applied condition.

6. The index table according to claim 4 wherein said second brake comprises a plurality of interleaved friction discs alternately splined, respectively, to said output shaft and a non-rotating member of said drive system.

7. The index table according to claim 1 further comprising a brake biasing member for urging said brake into an applied condition.

8. The index table according to claim 1 further comprising a clutch biasing member for urging said clutch into an engaged condition.

9. The index table according to claim 1 wherein, said brake comprises a plurality of interleaved friction discs alternately splined, respectively, to said housing and said one member of said planetary gear train.

10. The index table according to claim 1 wherein, said clutch comprises a plurality of interleaved friction discs alternately splined, respectively, to said another member of said planetary gear train and said output device.

11. A two speed drive system for an index table, said drive system comprising:

a housing;

an input device rotatably supported by said housing;

an output device rotatably supported by said housing;

a planetary gear train disposed between said input device and said output device;

a first selectively operable brake for prohibiting rotation of one member of said planetary gear train;

a selectively operable clutch for locking another member of said planetary gear train to said output device;

a second selectively operable brake for prohibiting rotation of said output device; and a worm drive having an input shaft and an output shaft, said input shaft being secured for rotation with said output device, said output shaft being disposed generally perpendicular to said input shaft.

12. The two speed drive system according to claim 11 wherein, said worm drive is disposed between said selectively operable clutch and said second selectively operable brake.

13. The two speed drive system according to claim 11 further comprising a brake biasing member for urging said second brake into an applied condition.

14. The two speed drive system according to claim 11 wherein said second brake comprises a plurality of interleaved friction discs alternately splined, respectively, to said output shaft and a non-rotating member of said drive system.

15. The two speed drive system according to claim 11 further comprising a brake biasing member for urging said first brake into an applied condition.

16. The two speed drive system according to claim 11 further comprising a clutch biasing member for urging said clutch into an engaged condition.

17. The two speed drive system according to claim 11 wherein, said first brake comprises a plurality of interleaved friction discs alternately splined, respectively, to said housing and said one member of said planetary gear train.

18. The two speed drive system according to claim 11 wherein, said clutch comprises a plurality of interleaved friction discs alternately splined, respectively, to said another member of said planetary gear train and said output device.

* * * * *

UNITED STATES PATENT AND TRADEMARK OFFICE
CERTIFICATE OF CORRECTION

PATENT NO. : 5,540,120

DATED : July 30, 1996

INVENTOR(S) : Gordon M. Sommer

It is certified that error appears in the above-indentified patent and that said Letters Patent is hereby corrected as shown below:

[57] Abstract, line 4, "table, the" should be --table. The--.

Col. 1, line 33, "station" should be --stations--

Col. 1, line 37, "complete" should be --completed--

Col. 2, line 40, "an" should be --a--

Col. 2, line 40, "view in," should be --view, in--

Col. 4, line 24, "rods 120," should be --rods 120.--

Col. 7, line 15, "for" should be --to--

Col. 8, line 3, "housing 31 0" should be --housing 310--

Col. 8, line 51, "carrier 1 52" should be --carrier 152--

UNITED STATES PATENT AND TRADEMARK OFFICE
CERTIFICATE OF CORRECTION

PATENT NO. : 5,540,120

DATED : July 30, 1996

INVENTOR(S) : Gordon M. Sommer

It is certified that error appears in the above-indentified patent and that said Letters Patent is hereby corrected as shown below:

Col. 9, line 15, "or" should be --of--

Col. 9, line 24, "FIGS. 10-12 should be --FIGS. 10-12,--

Col. 9, line 30, "nut 41 4" should be --nut 414--

Col. 9, line 32, "housing 41 0" should be --housing 410--

Col. 9, line 49, "nut 41 4" should be --nut 414--

Col. 9, line 67, "housing." should be --housing 410.--

Col. 10, line 40, delete "and"

Col. 10, line 41, "shaft 51 0" should be --shaft 510--

Col. 11, line 65, "nut 41 4" should be --nut 414--

Signed and Sealed this

Twenty-first Day of January, 1997

Attest:

BRUCE LEHMAN

Attesting Officer   Commissioner of Patents and Trademarks